United States Patent
Milakovich et al.

[11] Patent Number: 6,029,181
[45] Date of Patent: Feb. 22, 2000

[54] SYSTEM AND METHOD FOR TRANSLATING VISUAL DISPLAY OBJECT FILES FROM NON-COMPONENT OBJECT MODEL (COM) OBJECTS TO COM OBJECTS

[75] Inventors: Katherine S. Milakovich, Peoria; Hiroki Tsuboi, Phoenix, both of Ariz.

[73] Assignee: Honeywell, Inc., Minneapolis, Minn.

[21] Appl. No.: 08/721,254

[22] Filed: Sep. 26, 1996

[51] Int. Cl.⁷ .................................................. G06T 5/00
[52] U.S. Cl. ........................................ 707/523; 345/342
[58] Field of Search ............................. 707/523; 345/342

[56] References Cited

U.S. PATENT DOCUMENTS

| | | | |
|---|---|---|---|
| 4,607,256 | 8/1986 | Henzel | 364/133 |
| 5,333,298 | 7/1994 | Bland et al. | 364/229 |
| 5,386,503 | 1/1995 | Staggs et al. | 345/342 |
| 5,506,985 | 4/1996 | Motoyama et al. | 707/523 |
| 5,537,592 | 7/1996 | King et al. | 707/200 |
| 5,583,761 | 12/1996 | Chou | 707/536 |
| 5,675,796 | 10/1997 | Hodges et al. | 707/8 |
| 5,708,828 | 1/1998 | Colemann | 707/523 |

OTHER PUBLICATIONS

Offermann; Object Technology and Client–Server Computing V14, N. 7, p. 48 (6), Jul. 1996.

"PostScript und Encapsulated PostScript" by Peter Vollenweider; pp. 261–269; 1989.

"A General Methodology for Data Conversion and Restructuring" by V.Y. Lum, N.C. Shu, B.C. Housel; pp. 483–497; Sep. 1976.

IBM Technical Disclosure Bulletin entitled "New Mechanism for Manipulating Hierarchical Structures" Jul. 1993; pp. 261–267.

*Primary Examiner*—Almis R. Jankus
*Assistant Examiner*—Huedung X. Cao
*Attorney, Agent, or Firm*—Hitt Chwang & Gaines

[57] ABSTRACT

A system for, and method of, translating a source visual display file having a plurality of related non-Component Object Model ("COM") objects arranged in a source file format into a destination visual display file having a destination file format. The system includes: (1) a reading circuit that reads the plurality of related non-COM objects of the source visual display file, (2) a transposition circuit that transposes at least some of the plurality of related non-COM objects from the source file format into the destination file format and (3) a translation circuit that converts at least some of the transposed plurality of related non-COM objects into COM objects, the source visual display file thereby translated into the destination visual display file capable of generating a visual display substantially similar to the source visual display file.

21 Claims, 5 Drawing Sheets

Microfiche Appendix Included
(1 Microfiche, 20 Pages)

|  | Pr'tn Level (314) | Level 2 (316) | Lit Beh (318) | Con Beh (320) | Var Sort (322) | Obj Type (324) |
|---|---|---|---|---|---|---|
| DESCRIPTOR PORTION BEGIN | 1 | begin | 0 | 0 | 0 | 0 |
| EOL Descriptor Object | 1 | 0 | 0 | 0 | 0 | 1 |
| Picture Descriptor Object | 1 | 0 | 0 | 0 | 0 | 2 |
| DESCRIPTOR PORTION END | 1 | end | 0 | 0 | 0 | 0 |
| SUBPICTURE PORTION BEGIN | 2 | begin | 0 | 0 | 0 | 0 |
| EOL Reference for Subpicture 1 | 2 | 1 | 0 | 0 | 0 | 4 |
| ○ ○ |  |  |  |  |  |  |
| EOL Reference for Subpicture S | 2 | S | 0 | 0 | 0 | 4 |
| SUBPICTURE PORTION END | 2 | end | 0 | 0 | 0 | 0 |
| CONSTANT PORTION BEGIN | 3 | begin | 0 | 0 | 0 | 0 |
| Constant Object | 3 | 0 | X | X | 0 | X |
| ○ ○ |  |  |  |  |  |  |
| Constant Object | 3 | 0 | X | X | 0 | X |
| CONSTANT PORTION END | 3 | end | 0 | 0 | 0 | 0 |
| UPDATE PORTION BEGIN | 4 | begin | 0 | 0 | 0 | 0 |
| Update Object | 4 | 0 | X | X | X | X |
| ○ ○ |  |  |  |  |  |  |
| Update Object | 4 | 0 | X | X | X | X |
| UPDATE PORTION END | 4 | end | 0 | 0 | 0 | 0 |

SYSTEM AND METHOD FOR TRANSLATING VISUAL DISPLAY OBJECT FILES FROM NON-COMPONENT OBJECT MODEL (COM) OBJECTS TO COM OBJECTS

CROSS-REFERENCE TO RELATED APPLICATIONS

The present invention is related to that disclosed in U.S. Pat. No. 5,386,503 issued to Staggs, et al., on Jan. 31, 1995, entitled "Method for Controlling Window Displays in an Open Systems Environment." The above-referenced patent is commonly assigned with the present invention and incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

REFERENCE TO MICROFICHE APPENDIX

A microfiche appendix containing a computer program listing (the "MMI Kernel") with 20 pages on 1 fiche, was submitted with this application and is incorporated herein by reference.

TECHNICAL FIELD OF THE INVENTION

The present invention is directed, in general, to computing systems and, more specifically, to a system for translating visual display object files between different object file paradigms and a method of operation thereof.

BACKGROUND OF THE INVENTION

Automated plant control systems (e.g., TDC 2000 or TDC 3000 Industrial Automation Systems manufactured by, and commercially available from, Honeywell Incorporated of Phoenix, Ariz.) include a comprehensive set of algorithms and auxiliaries to control and monitor various processes within, for instance, a manufacturing facility. The control systems can be tailored to satisfy a wide range of process requirements globally or within specified portions of the facility. Conventionally, the control systems include a plurality of modules, each having its own processor and firmware, linked together by a communication bus thereby resulting in a distributed process control system. The distributed nature of the system affords high performance with the capability to expand the system incrementally to satisfy growth or modifications in the facility.

A first objective of automated plant management is to provide a control scheme that synthesizes plant-wide control of all processes therein to improve an overall efficiency of the facility. A second objective is to couple the control scheme to the facility by providing a real time data acquisition and monitoring scheme that monitors the operation of the facility by collecting historical and real time data and responding to deviations from desired operation that may arise and displaying the data for the benefit of a user.

Regarding the first objective, U.S. Pat. No. 4,607,256 provides a plant-wide system for monitoring and controlling an industrial and electrical utility plant, including communication within the system and the related management of the processes within the plant. More specifically, the plant management system incorporates a "token-passing" arrangement employing separate modules of various types. A module transmits information to or receives information from another module located on a common bus. Each of the modules functions as a peer within the network and is assigned an individual network address. A token passed among the modules gives the module that possesses the token the right to access the bus and transmit a signal to the address of another module located on the bus. Automated control systems, such as the one disclosed in U.S. Pat. No. 4,607,256, are well known in the art.

Regarding the second objective, it is important to have access to current data concerning the operation of the plant and to display that data in a meaningful and useful manner to the user. Toward this objective, the prior art has provided visual displays that are graphical in nature. Conventional displays contain graphical representations of devices in the plant (such as vats, pipes or pumps); operational or historical data associated with the devices are associated with the graphical representations to complete the visual paradigm for the user.

Unfortunately, the process of creating routines or files to generate the visual displays historically has been complex and involved, requiring the use of conventional computer languages wherein basic graphical elements (such as points, lines or curves) are first required to be defined and then placed relative to one another to represent the devices in the plant (such as the vats, pipes or pumps). Even with the advent of conventional object-oriented programming languages, wherein the devices are represented as objects consisting of their constituent basic graphical elements and wherein devices are recursively grouped into sets to form an entire visual display object file, the process of creating the file to generate a visual display has remained difficult and expensive.

Recently, newer computer languages, such as those designed in accordance with the Microsoft Foundation Class ("MFC") Component Object Model ("COM") specification, have been developed. The COM specification offers more predefined, more sophisticated graphical elements (such as polygons and ellipses) and employs a more powerful structural paradigm for arranging the objects. Because the COM specification already predefine the more sophisticated elements, the need to define the elements is eliminated and the process of placing the elements relative to one another on the visual display is significantly simplified.

However, a substantial number of existing plant control systems use visual display object files developed by means of the conventional object-oriented programming languages. When considering whether to upgrade these existing systems, owners of the existing systems are reluctant to dispose of the visual display object files in which they have invested heavily and that are reassuringly familiar to system users. The owners would much rather upgrade to the COM specification invisibly and automatically, retaining the "look and feel" of the visual displays of their existing systems at minimal cost.

What is needed in the art is a system and method for translating conventional, visual display object files automatically into files expressed in newer, COM-based computer languages to avoid the expense of manual translation or redevelopment of such routines.

SUMMARY OF THE INVENTION

To address the above-discussed deficiencies of the prior art, it is a primary object of the present invention to provide a system and method for automatically translating existing visual display object files into COM-compliant object files.

In the attainment of the above primary object, the present invention provides a system for, and method of, translating a source visual display file having a plurality of related non-COM objects arranged in a source file format into a destination visual display file having a destination file format. The system includes: (1) a reading circuit that reads the plurality of related non-COM objects of the source visual display file, (2) a transposition circuit that transposes at least some of the plurality of related non-COM objects from the source file format into the destination file format and (3) a translation circuit that converts at least some of the transposed plurality of related non-COM objects into COM objects, the source visual display file thereby translated into the destination visual display file capable of generating a visual display substantially similar to the source visual display file.

The present invention is not simply a file translator, because objects in the source and destination files do not necessarily bear a one-to-one correspondence. In fact, the correspondence is dependent upon the number of objects that can be translated into the predefined, more sophisticated graphical elements provided in the COM specification. Thus, the present invention is most preferably directed to a three-step process of reading, transposing to the destination object structure and translating, wherever possible, non-COM objects into predefined objects.

In a preferred embodiment of the present invention, the reading circuit treats the source visual display file as a subpicture, the system thereby being a recursive translator. In a manner to be illustrated more fully, the source visual display file can be recursive. In such circumstances, it is best to treat the source visual display file as a subpicture (a picture within a picture).

In a preferred embodiment of the present invention, the reading circuit creates an intermediate file comprising: (1) a main picture containing a header record, (2) a main subpicture containing the plurality of related non-COM objects and (3) a data structure associated with data variables of the source visual display file, the data structure containing a symbol table. Although the intermediate file is not necessary to the present invention, it does allow recursive translation of a source visual display file.

In a preferred embodiment of the present invention, the source visual display file contains a symbol table, the translation circuit translating the symbol table into an intermediate file. The purpose and preferred structure of the symbol file will be described below.

In a preferred embodiment of the present invention, the source visual display file contains an edit object item ("EOI") containing a data type selected from the group consisting of: (1) portion_level, (2) object_kind, (3) bounding_box, (4) level_2, (5) inherited_behavior, (6) literal, (7) counter and (8) variant. In a related, preferred embodiment of the present invention, the source visual display file contains an EOI containing an object_info_rec data type. EOIs and their function will further be described in the Detailed Description to follow.

In a preferred embodiment of the present invention, the source visual display file contains an object selected from the group consisting of: (1) a picture descriptor object, (2) a subpicture/phantom edit object list ("EOL") reference object, (3) a line object, (4) a solid object, (5) a subpicture reference object, (6) answer port information, (7) an EOL descriptor object, (8) a comment object, (9) a bar object, (10) a behavior object, (11) a target object, (12) a value object, (13) a variant object and (14) a symbol table record. Although this list of objects is not exhaustive, it does indicate that a variety of possible objects may be contained in the source visual display file according to this preferred embodiment. Other object types are fully within the broad scope of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A–3E illustrate an exemplary source visual display object file structure;

DETAILED DESCRIPTION

Figure 1:
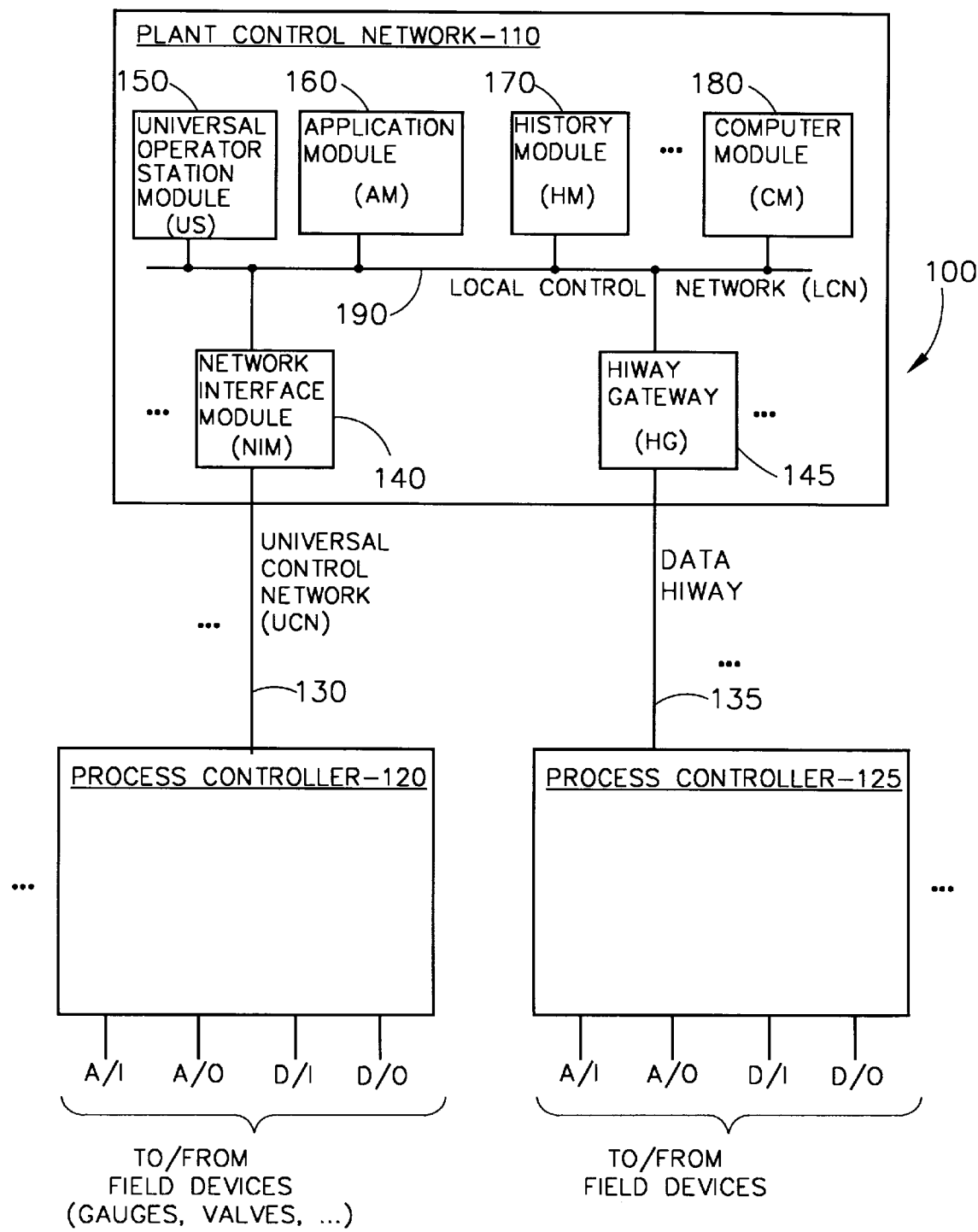
FIG. 1 illustrates a block diagram of a process control system that provides an environment in which the present invention may be used.

Before describing the system and method of the present invention, it will be helpful in understanding a system environment in which the present invention may be used. Accordingly, referring initially to FIG. 1, illustrated is a block diagram of a process control system 100 in which the system and method of the present invention may be found. The process control system 100 includes a plant control network 110 coupled to a plurality of process controllers 120, 125 via a network interface module ("NIM") 140 and highway gateway ("HG") 145 over a universal control network ("UCN") 130 and data highway 135, respectively. Additional process controllers can be operatively connected to the plant control network 110, if so desired. The process controllers 120, 125 interface analog input and output signals ("A/I," "A/O," "D/I" and "D/O", respectively) to the process control system 100 from a variety of field devices (not shown) including valves, pressure switches, pressure gauges, thermocouples and the like.

The plant control network 110 provides the overall supervision of a controlled process in conjunction with the plant operator, and obtains all the information needed to perform the supervisory function, and includes an interface with the operator. The plant control network 110 includes a plurality of physical modules including, without limitation, a universal operator station module ("US") 150, an application module ("AM") 160, a history module ("HM") 170, a computer module ("CM") 180 and duplicates of these modules (and additional types of modules, not shown) as necessary to perform the required control/supervisory function of the process being controlled. Each of these physical modules is operatively connected to a local control network ("LCN") 190 that permits each of these modules to communicate with each other as necessary. The NIM 140 and HG 145 provide an interface between the LCN 190 and the UCN 130 and data highway 135, respectively.

Each of the physical modules 150, 160, 170, 180 of the plant control network 110 includes its own unique functionality. Furthermore, the physical modules 150, 160, 170, 180 are peers, or equivalents, of one another with equal access to the communication medium, or LCN 190, of the process control system 100 for the purpose of transmitting information therebetween.

The US 150 of the plant control network 110 is a workstation for one or more plant operators. It includes an operator console that is the interface between the plant operator, or operators, and the process or processes of the plant for which they are responsible. Each US 150 and any backup modules (not shown), for example, is connected to the LCN 190, and all communication between the US 150 and any other module (e.g., AM 160, HM 170, NIM 140) of the plant control network 110, including any backup modules (not shown) is by means of the LCN 190. The US 150 has access to data that are on the LCN 190 and the resources and data available through, or from, any of the other modules of the plant control network 110. Each US 150 includes a visual presentation including, for instance, a cathode ray tube display, designated CRT, that, in turn, includes a video display generator, an operator keyboard, a floppy disk data storage device, trend pen recorders and status displays, for example (not shown).

Another type of physical module included in the plant control network 110 is the HM 160 that provides mass data storage capability. Each HM 160 includes at least one conventional disk mass-storage device, such a Winchester disk, which disk mass-storage device provides a large volume of nonvolatile, nonremovable storage capability for binary data. The types of data stored by such mass storage device are typically trend histories or data from which such trends can be determined, data that constitute or form CRT-type displays, copies of programs for the units of the process controllers 120, 125 for the modules (e.g., US 150, AM 160) or for units of the modules of the plant control network 110.

Another type of module incorporated into the plant control network 110 is the AM 160. The AM 160 provides additional data processing capability in support of the process control functions performed by the process controllers 120, 125, such as data acquisition, alarming, batch history collection and providing continuous control computational facilities when needed. The data processing capability of the AM 160 is provided by its module processor and module memory (not shown).

The CM 180 uses the standard or common units of all physical modules to permit a medium-to-large scale, general-purpose data processing system to communicate with other modules (e.g., US 150, AM 160) of the plant control network 110 and the units of such modules over LCN 190 and the units of the process controllers 120, 125 via the NIM 140 or HG 145, respectively. Data processing systems of the CM 180 are used to provide supervision, optimization, generalized user program preparation and execution of such programs in higher-level program languages. Typically, the data processing systems of the CM 180 have the capability of communicating with other such systems by a communication processor and communication lines, as is well known in the art. The CM 180 can include one of several kinds of computers and operating systems. Honeywell DPS-6 computers, for instance, may be employed in the CM 180.

The LCN 190 of the present embodiment employs a high-speed, bit serial dual redundant communication bus that interconnects all the modules (e.g., US 150, AM 160) of the plant control network 110. The LCN 190 provides the only data transfer path between the principal sources of data, such as the NIM 140, HG 145, AM 160 and HM 170 and the principal users of such data, such as the US 150, AM 160 and CM 180. The LCN 190 also provides the communication medium over which large blocks of data, such as memory images, can be moved from one module, such as HM 170, to another, such as US 150.

Each of the physical modules (e.g., US 150, AM 160) of the plant control network 110 of the present embodiment includes certain, or required, standard units. A more complete description of the plant control network 110 and the physical modules can be had by reference to U.S. Pat. Nos. 5,333,298 and 5,386,503. The system and method of the present invention are embodied within the physical modules of the plant control network 110.

Figure 2:
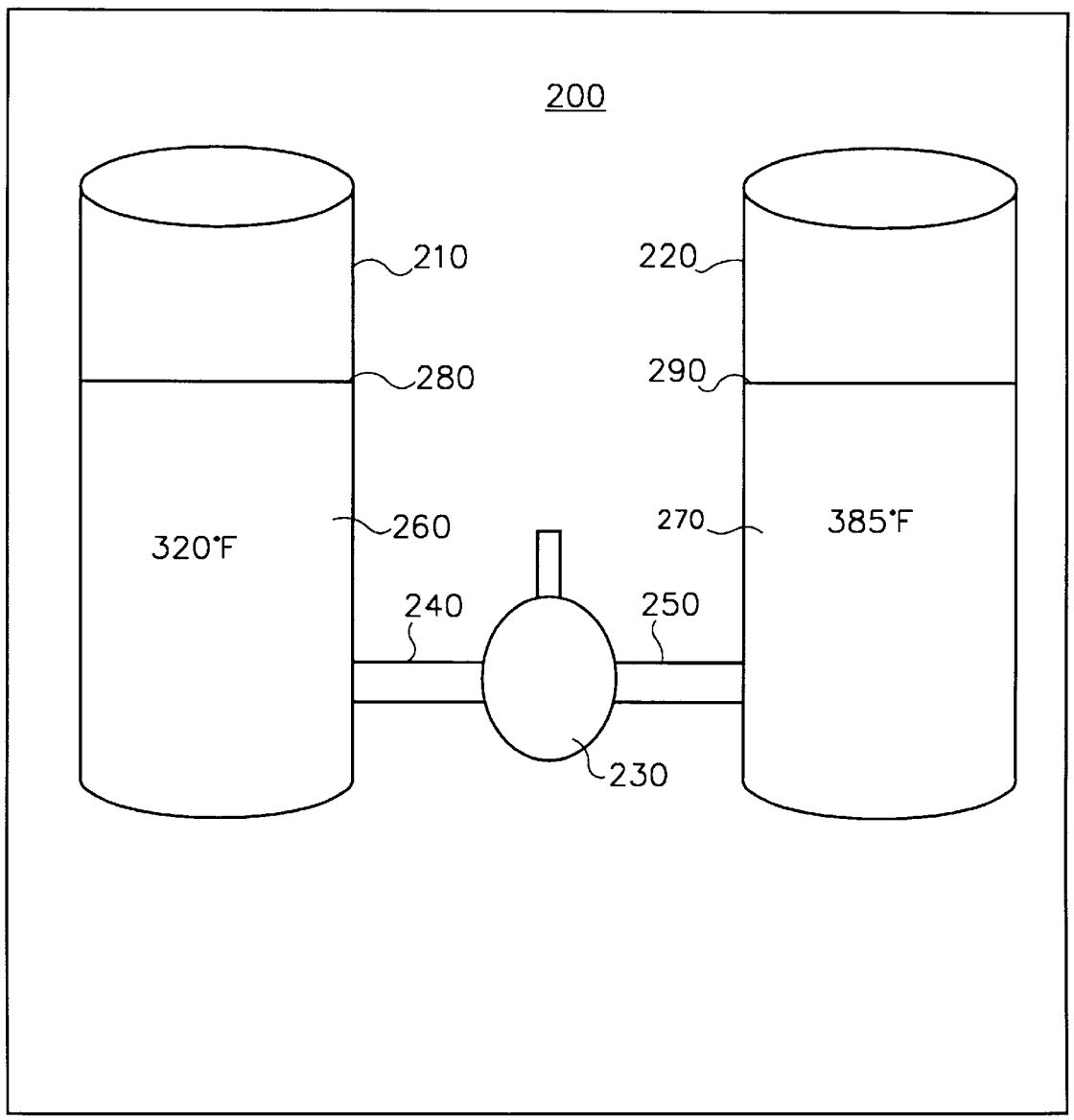
FIG. 2 illustrates an exemplary visual display according to the present invention.

Turning now to FIG. 2, illustrated is an exemplary visual display according to the present invention. The visual display, generally designated 200, graphically conveys a simple chemical process occurring in a plant (not shown) to a user, allowing the user to control the process. The visual display 200 comprises a first graphical element 210, taking the rudimentary form of a vat for containing a liquid, that corresponds to and symbolizes a first vat (not shown) in the plant. Likewise, a second graphical element 220 takes the rudimentary form of a liquid vat and corresponds to and symbolizes a second vat (not shown) in the plant. A third graphical element 230 takes the rudimentary form of a valve for controlling a fluid flow rate and corresponds to and symbolizes a valve (not shown) in the plant. Finally, fourth and fifth graphical elements 240, 250 take the rudimentary form of pipe-sections and correspond to and symbolize first and second pipe-sections in the plant that couple the first vat to the valve and the valve to the second vat, respectively.

The simple chemical process may be as follows. A catalyst is contained in the first vat. An exothermic chemical reaction is to take place in the second vat. The process control system 100 of FIG. 1 monitors the temperature of the second vat and controls the valve to adjust the flow of the liquid contained in the first vat from the first vat to the second vat. In this process, if the temperature of the second vat is deemed too low, introduction of the catalyst thereto is increased, thereby increasing heat production and vat temperature. Likewise, if the temperature of the second vat is deemed too high, introduction of the catalyst thereto is decreased, thereby decreasing heat production and vat temperature.

It is important therefore, with respect to this example, that the visual display 200 also indicate at least the temperature of the first and second vats. These values are designated 260 and 270, respectively. Further, it is desired to show liquid levels in both the first and second vats to ensure that liquid levels do not deviate from acceptable ranges. These values are designated 280 and 290, respectively.

A visual display generating program exists within the plant control system 100 of FIG. 1. As previously described, the program uses a visual display object file structure to generate the visual display 200 of FIG. 2. The visual display object file therefore should contain data required to generate the visual display 200, including data for generating the first, second, third, fourth and fifth graphical elements 210, 220, 230, 240, 250 and data (address pointers and the like) required to obtain the temperature and liquid level indicators 260, 270, 280, 290. These data are collectively organized within the visual display object file according to a standard structure.

* Turning now concurrently to FIGS. 3A–3E, illustrated is an exemplary visual display object file structure. The visual display object file of FIGS. 3A–3E is one from which the present invention can translate; therefore, the visual display object file is referred to as a source visual display object file having a source file format. The structure of FIGS. 3A–3E is based on EOIs (FIG. 3A**) placed in a series to form an EOL.

The components of an EOI (FIG. 3A) are as follows. The sort key component 300 of an EOI serves to order the individual objects in the EOL. The EOL primitives sort the individual EOIs in an EOL such that the sort keys 300 for the EOIs are in ascending order.

Figures 3A, 3B, 3C, 3D:
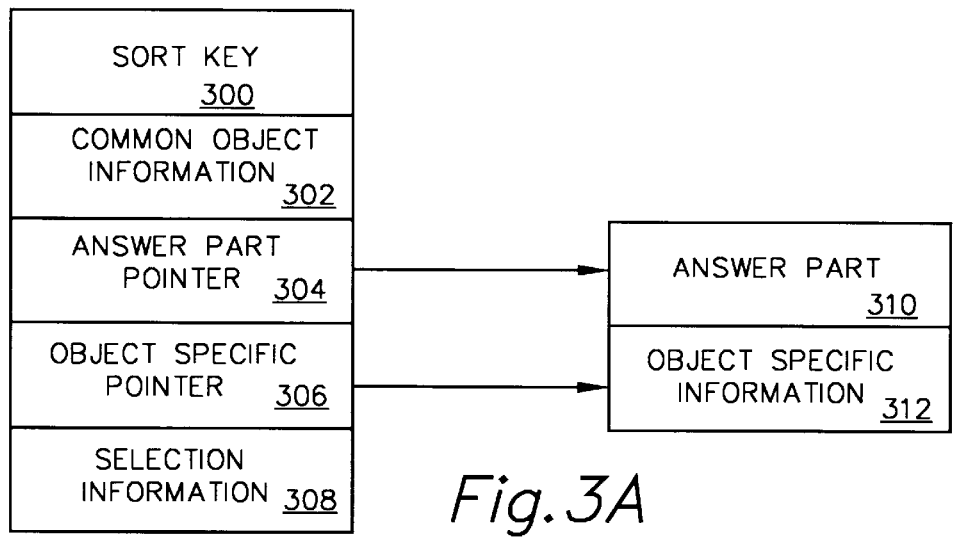

The sort key 300 is a structured type, the individual components of which are shown in FIG. 3B. The portion level field 314 is used to affect the first order sorting of an EOL. The particular usage of the portion level field 314 will be explained below in greater detail. The level 2 field 316 is used to affect the second order sorting of an EOL. The particular usage of the level 2 field 316 will also be explained below in greater detail. The Literal (or Inherited) Behavior field 318 indicates whether the object defined by the EOI inherits the behavior of the object that contains it. The Literal Behavior field 318 contains an encoding of the literal behavior of an object. This results in all objects that share a common literal behavior to be grouped together in the EOL. Thus, when the EOL is compiled, the resulting "object code" will have all objects of a common literal behavior grouped. This allows a denser representation of an abstract. The Literal Behavior field 318 is a structured type, the subfields of which are shown in FIG. 3C in symbolic form.

The Literal Behavior Exists flag subfield 326 of the Literal Behavior field 318 indicates if a literal behavior exists for the object. The Literal Behavior Exists flag subfield 326 is encoded as follows: (1) SET means a literal behavior exists (the rest of the fields contain the literal behavior information) and (2) RESET means no literal behavior exists (the rest of the fields 328, 330, 332, 334 are set to zero). The Reverse Field flag subfield 328 of the Literal Behavior field 318 indicates if reverse field applies to the object. The Reverse Field flag subfield 328 is encoded as follows: (1) SET means reverse field and (2) RESET means no reverse field. The Intensity flag subfield 330 of the Literal Behavior field 318 indicates if half intensity applies to the object. The Intensity flag subfield 330 is encoded as follows: (1) SET means full intensity and (2) RESET means half intensity. The Blink flag subfield 332 of the Literal Behavior field 318 indicates if blink applies to the object. The Blink flag subfield 332 is encoded as follows: (1) SET means blink applies and (2) RESET means blink does not apply. The Color subfield 334 of the Literal Behavior field 318 contains the color information for the object. Encoding of the Color subfield 334 is equivalent to the encoding used by MMI primitives (K$Color_Enm).

The Conditional Behavior field 320 of the sort key 300 contains the index of the conditional behavior that applies to the object. This results in all objects that share a common conditional behavior being sorted together. Since the object type code for a behavior object is less than all other object type codes, objects that share a common conditional behavior follow the conditional behavior object. Note that the Conditional Behavior field 320 and the Literal Behavior field 318 are mutually exclusive. That is, since a single object can have at most one behavior, if an object has a literal behavior, the Conditional Behavior field 320 must be zero, and vice versa.

The Variant Sort field 322 of the sort key 300 contains information regarding the sorting of EOIs under a variant EOI. The Variant Sort field 322 is a structured type, the subfields of which are shown in FIG. 3D in symbolic form.

The Number subfield 336 of the Variant Sort field 322 contains the index of the variant under which to sort the object EOI. The Limb subfield 338 contains the number of this object. When the variant is processed, every object is assigned a number corresponding to the position of the object in the variant limbs. For example, when the variant

```
IF <condition I>
THEN
    IF <condition 2>
    THEN Fred
    ELSE Ralph
    END
ELSE Sam
END
``` is processed, the subpicture reference EOI for Fred is assigned 1 as its Limb field, the subpicture reference EOI for Ralph is assigned 2, etc.

An Object Type field 324 of the sort key 300 contains the object type code of the EOI.

The Common Object Information field 302 of the EOI is used to contain information that is common to the majority of objects and allows uniform processing of the object. It contains the position of the object and an indication if the object is scalable or not.

The value of each of these fields for a particular object is supplied when the object is added to the EOL. General information on each of the fields follows. "Scaleable" is a boolean that indicates if the object is scalable or not. Any object that results in the output of text is not scalable, nor are conditional behaviors scalable. "x1, y1" describe the lower left corner of the minimal bounding box of the object. "x2, y2" describe the upper right corner of the minimal bounding box for the object. The minimal bounding box is defined as the smallest rectangle that can contain the object. For scalable objects, the coordinates of the minimal bounding box of the object are specified in world units. For non-scalable objects, the coordinates of the bounding box are specified in character units relative to the containing text port. Thus, for a non-scalable object in a subpicture, the bounding box coordinates are specified relative to the textport defined in the reference to the subpicture.

The Answer Part Pointer field 304 of an EOI contains a pointer to an answer part 310 for the form used to create the object. For example, for a value object, the Answer Part Pointer field 304 contains a pointer to the form answers for the value form. For objects that do not require a form, this field is null.

The Object Specific Pointer field 306 of an EOI contains a pointer to any object specific information 312 for the object. For example, for a line object, the Object Specific Pointer field 306 points to the coordinates for the line. For objects that do not have any object specific information, this field is null.

The Selection Information field 308 contains information used by the EOL primitives in maintaining selection information.

The Sort Key type is defined to allow two perceptions of the sort key 300. The first is the perception of the user of the EOL primitives. This user sees the sort key 300 as being composed of distinct fields. The EOL primitives perceive the sort key 300 as an array of integers. This allows the primitives to implement the comparison of two sort keys 300 easily.

The structure for an EOL used to represent a picture during the edit process is as follows.

```
DESCRIPTOR PORTION BEGIN
    EOL Descriptor Object
    Picture Descriptor Object
DESCRIPTOR PORTION END
SUBPICTURE PORTION BEGIN
    EOL Reference for Subpicture 1
    0
    0
    EOL Reference for Subpicture S
SUBPICTURE PORTION END
CONSTANT PORTION BEGIN
    Constant Object
    0
    0
    Constant Object
CONSTANT PORTION END
UPDATE PORTION BEGIN
    Update Object
    0
    0
    Update Object
UPDATE PORTION END
VARIABLES
```

The picture is structured as a set of portions, each of which is delimited by a "Begin–End". Each object in the EOL is represented by a pseudo "statement." FIG. 3E relates each object of the structure above to the sort key 300 values for that object. In FIG. 3E, "X" represents information in the sort key 300 that is object-dependent.

Note that the Portion field serves to define the portion of the picture, and the Level 2 field is used in various ways (e.g., to mark the end of a portion or contain the subpicture reference).

Set forth in the MMI Kernel (paged 75–93) are a "main include file" and a "primitives system include file" for the source visual display object file. Those of skill in the art will understand that the present invention can advantageously employ the include files to capture the substantial contents of the source visual display file as a subpicture. This allows the translation system and method of the present invention to operate on the source visual display file by transposing at least some of the related non-COM objects from the source file format into the destination file format converting at least some of the transposed plurality of related non-COM objects into COM objects. Of course, the include files are given by way of example only; the present invention is not limited by the structure or expression of the illustrated include files.

The destination structure comprises picture primitives ("PP" objects). The PP objects are the base graphical objects that the visual display program uses to create the visual display. The visual display program preferably operates on the PP objects in two steps: build time and runtime. Those skilled in the art will understand how build time and runtime steps function in an object-oriented programming environment.

According to the illustrated embodiment of the present invention, PP objects are implemented as MFC COM objects derived from CCmdTarget. All PP objects are derived from CStdobj, which is derived from CCmdTarget. CStdobj defines the custom interfaces used by the derived classes. It also defines the base attributes of PP objects.

Following is a description of each PP class, as implemented in a C++ environment:

"CStdobj" is derived from CCmdTarget. This virtual class defines the OLE interfaces to all PP objects. Attributes common to all PP objects are defined in this class.

"CDrawline" is derived from CStdobj. A single line segment determined by two points.

"CFilledObj" is derived from CStdobj. This abstract class defines the fill attributes.

"CDrawRect" is derived from CFilledObj. A Rectangle determined by two points.

"CdrawEllipse" is derived from CDrawRect. An Ellipse is determined by two points.

"CdrawRndRect" is derived from CDrawRect. A Round Rectangle is determined by two points and a roundness point.

"CDrawText" is derived from CdrawRect.

"CDrawPoly" is derived from CFilledObj. A polygon is determined by two or more points. The polygon can be either open or closed.

"CStdobj" is derived from CCmdTarget. This abstract class defines the OLE interfaces to all PP objects. Attributes common to all PP are defined in this class.

Following is a description of each CStdobj attribute:

| | |
|---|---|
| m_bDirty | Have we changed since the last save? (True, False) |
| m_bvisible | Are we visible? (True, False) |
| m_bInvalidate | Do we perform invalidation? (True, False) |
| m_p1NotifyChange | The pointer to the callback interface. |
| m_nPoints | The number of points in the PP. |
| m_nNumHandles | The number of handles. |
| m_nNumRotateHandles | The number of rotate handles. |
| m_nAllocPoints | The number of allocated points. |
| m_points | The pointer to the array of points. |
| m_RotateOffset | The offset from the centerpoint. |
| m_centerPoint | The 'center' of the PP. |
| m_extent | The extent of the object. |
| m_OldExtent | The extent used during the last execution of Draw( ). Used to define the area on the screen that needs to be redrawn. |
| m_bHasEdge | Draw the edge if true. |
| m_logPen | The logical GDI Pen used to draw the edge. |
| m_OldPen | A pointer to the pen that was used prior to this PP. Used to reset the Win32 pen. |
| m_dAngle | The rotation, in degrees. |
| m_dScaleX | The X direction scale factor. |
| m_dScaleY | The Y direction scale factor. |
| m_dShearX | The X direction shear factor. |
| m_dShearY | The Y direction shear factor. |
| m_dTransX | The X direction translation. |
| m_dTransY | The Y direction translation. |
| m_xfrmMatrix | The transformation matrix. |
| m_xfrmOldMatrix | The transformation matrix used during the last execution of Draw( ) Used to define the area of the screen that needs to be redrawn. |
| m_strName | The PP external name. |
| m_strNote | The PP description field. |
| m_BkMode | The GDI background mode. |
| m_nOldBkMode | The background mode used prior to this PP. Used to rest the Win32 background mode. |

Following is a description of the CStdobj methods:

| | |
|---|---|
| InternalCreate | A static method used to create CStdobj derived objects. |
| Create | A static method used to create CStdobj derived objects. |
| AssertValid | A debug method. |
| Dump | A debug method. |
| GetNotifyChange | Get INotifyChange member variable. |
| SetNotifyChange | Set INotifyChange member variable. |
| Invalidate | Use INotifyChange member variable to notify that the object has changed. |
| GetExtent | Return the extent of the PP. |
| GetOldExtent | Return the extent used during the last redraw of the PP. |
| GetMatrix | Get the transformation matrix attribute. |
| GetOldMatrix | Get the transformation matrix attribute used during the last redraw of the PP. |
| SetMatrix | Set the transformation matrix attribute. |
| LoadIdentifyMatrix | Load the Identity matrix into the matrix attribute. |
| GetPrimType | Return the enumeration value for this CStdobj derived class. |
| GetNumHandles | Return the number of handles used to manipulate this PP. |
| GetHandles | Return a list of handles. |
| GetHandleIndex | Return the handle index at the given point. |
| MoveHandleTo | Move the handle to the point. |
| GetRotateHandles | Return a list of rotate handles. |
| GetNumRotateHandles | Return the number of rotate handles. |
| GetRotateHandleIndex | Return the rotate handle index at the given point. |
| MoveRotateHandleTo | Move the rotate handle to the point. |
| GetNumPoints | Get the number of points defining the PP. |
| GetPoint | Return the Indexed point. |
| SetPoint | Set the indexed point to the provided location. |
| Draw | Draw the PP. |
| HitTest | Is the point on or near the PP? (True, False) |
| InsideRect | Does the rectangle intersect or envelop the object? |
| AddPoint | Add a point to the PP in the n<sup>th</sup> position. |
| RemovePoint | Remove a point from the PP at the n<sup>th</sup> position. |
| Clone | Create a copy of this PP. |
| = | equate one PP to another PP. |
| Serialize | Store/Load the PP. |
| GetClassID | For IPersistStream. Return the class ID of the PP. |
| IsDirty | For IPersistStream. Return true if the object has changed since the last save. |
| Load | For IPersistStream. Load the CStdobj into the stream. |
| Save | For IPersistStream. Save the CStdobj into the stream. |
| GetSizeMax | For IPersistStream. Return the current size of the PP. |
| PreDraw | Set the drawing mode for the PP. |
| DrawObject | Draw the PP. |
| PostDraw | Reset the drawing mode. |
| RecalcBounds | Recalculate the center point and the extent of the PP. |
| NewPoints | Create a new CPoint array. |
| DoCannedTransforms | Apply the member variables to the transformation matrix attribute in a predefined order. |
| OnFinalRelease | When the last reference for an automation object is released, OnFinalRelease is called. This implementation deletes the object and any additional cleanup required |

-continued

| | |
|---|---|
| | for the object. |
| GetName | Get the Name attribute. |
| SetName | Set the Name attribute. |
| GetNote | Get the Note attribute. |
| SetNote | Set the Note attribute. |
| GetVisible | Get the visible attribute. |
| Setvisible | Set the visible attribute. |
| GelEdgeWidth | Get the edge width attribute. |
| SetEdgeWidth | Set the edge width attribute. |
| GetEdgeColor | Get the edge color attribute. |
| SetEdgeColor | Set the edge color attribute. |
| GetEdgeStyle | Get the edge style attribute. |
| SetEdgestyle | Set the edge style attribute. |
| GetScaleX | Get the scale factor in the X direction. |
| SctScaleX | Set the scale factor in the X direction. |
| GetScaleY | Get the scale factor in the Y direction. |
| SetScaleY | Set the scale factor in the Y direction. |
| GetSetAngle | Get the rotation angle, in degrees. |
| SetSetAngle | Set the rotation angle, in degrees. |
| GetShearX | Get the shear factor in the X direction. |
| SetShearX | Set the shear factor In the X direction. |
| GetShearY | Get the shear factor in the Y direction. |
| SetShearY | Set the shear factor in the Y direction. |
| GetTranslateX | Get the translation In the X direction. |
| SetTranslateX | Set the translation in the X direction. |
| GetTranslateY | Get the translation in the Y direction. |
| SetTranslateY | Set the translation in the Y direction. |
| GetInvalidateOnSet | Get the value of the "Invalidate on Set" flag. |
| SetInvalidateOnSet | Set the value of the "Invalidate on Set" flag. |
| Scale | Scale the PP. |
| Move | Change the position of the PP. |
| Shear | Shear the PP. |
| Rotate | Rotate the PP about a reference point. |

Following is a description of the interfaces used by CStdobj:

| | |
|---|---|
| IDrawPrimitive | The custom interface common to all PP objects. |

The methods are as follows:

Offset ( )
GetPoints ( )
SetPoint
GetPoint ( )
AddPoint ( )
RemovePoint ( )
HitTest ( )
GetExtent ( )
GetOldExtent ( )
InsideRect ( )
ReleaseHandle ( )
GrabHandle ( )
GrabHandleByIndex ( )
MoveHandleTo ( )
DrawHandles ( )
GrabRotateHandle ( )

-continued

| | |
|---|---|
| MoveRotateHandle ( ) | |
| DrawRotateHandles ( ) | |
| GetMatrix ( ) | |
| GetOldMatrix ( ) | |
| SetMatrix ( ) | |
| LoadIdentityMatrix ( ) | |
| Scale ( ) | |
| Shear ( ) | |
| Rotate ( ) | |
| Move ( ) | |
| GetPrimType ( ) | |
| Clone ( ) | |
| Serialize ( ) | |
| SetNotifychange ( ) | |
| IPersistStream | The interface for reading and writing the object from and to a stream created by the framework. |
| OLE Automation | The Automation interface is accessed by scripts and possibly third party applications. |
| INotifyChange | A "callback" interface used to notify the containing document that the object needs to be redrawn. |
| CDrawLine | CDrawLine renders a line. This class is derived from Cpictobj. CDrawLine has no additional attributes. |
| Following is a description of the CDrawLine methods: | |
| Create | A static method used to create CStdobj derived objects. |
| HitTest | Is the point on or near the PP? (True, False) |
| Clone | Create a copy of this PP. |
| DrawObject | Draw the PP. |

CFilledObj is an abstract class that encapsulates the concept of a filled object. This class is derived from Cpictobj. The following is a description of each CFilledObj attribute:

| | |
|---|---|
| m_bFill | Are we filled (True, False). |
| m_logbrush | The GDI logical brush used to fill the PP. |
| m_pOldBrush | The brush used prior to this PP. Used to rest the Win32 brush. |

The methods are as follows:

| | |
|---|---|
| Load | For IPersistStream. Load the CStdobj into the stream. |
| Save | For IPersistStream. Save the CStdobj into the stream. |
| GetSizeMat | For IPersistStream. Return the current size of the application. |
| PreDraw | Set the drawing mode for the application. |
| PostDraw | Reset the drawing mode. |
| GetFill | Get the fill attribute. |
| SetFill | Set the fill attribute. |
| GetFillColor | Get the fill color attribute. |
| SetFillColor | Set the fill color attribute. |
| GetFillPattern | Get the fill pattern attribute. |
| SetFillPattern | Set the fill pattern attribute. |

CFilledObj has no additional interfaces.

CDrawRect renders a rectangle. This class is derived from CFilledObj. CDrawRect has no additional attributes. Following is a description of CDrawRect methods:

| | |
|---|---|
| Create | A static method used to create CStdobj derived objects. |
| GetHandles | Return a list of handles. |
| MoveHandleTo | Move the handle to the paint. |
| HitTest | Is the point on or near the PP? (True, False) |
| Clone | Create a copy of this PP. |
| DrawObject | Draw the PP? |

CDrawObj has no additional interfaces.

CDrawEllipse renders an ellipse. This class is derived from CDrawRect. CDrawEllipse has no additional attributes. Following is a description of CDrawEllipse methods:

| | |
|---|---|
| Create | A static method used to create CStdobj derived objects. |
| HitTest | Is the point on or near the PP? (True, False) |
| Clone | Create a copy of this PP. |
| DrawObject | Draw the PP. |

CDrawEllipse has no additional interfaces.

CDrawRndRect renders a line. This class is derived from CDrawRect. The following is a description of each CDrawRndRect attribute.:

| | |
|---|---|
| m_roundness | The point that defines the roundness&of the corners. |
| Following is a description of the CDrawRndRect methods. | |
| Create | A static method used to create CStdobj derived objects. |
| GetHandles | Return a list of handles. |
| MoveHandleTo | Move the handle to the point. |
| HitTest | Is the point on or near the PP? (True, False) |
| Clone | Create a copy of this PP. |
| = | equate one PP to another PP. |
| Load | For IPersistStream. Load the CStdobj into the stream. |
| Save | For IPersistStream. Save the CStdobj into the stream. |
| GetSizeMax | For IPersistStream. Return the current size of the PP. |
| DrawObject | Draw the PP. |

CDrawRndRect has no additional interfaces.

CDrawText renders text. This class is derived from CDrawRecL. Following is a description of each CDrawtext attribute:

| | |
|---|---|
| m_rText | The displayed text. |
| m_bFont | Use the font defined by m_logfont. |
| m_logfont | The logical font. |
| m_fontColor | The font color. |
| m_OldFontColor | |
| m_OldFort | Temporary holder of the last font used by the dc. |
| m_uAlignment | One of the GDI defines of: DT_LEFT, DT_CENTER or DT_RIGHT. |

Following is a description of the CDrawText methods:

| | |
|---|---|
| Create | A static method used to create CStdobj derived objects. |
| GetHandles | Return a list of handles. |
| MoveHandleTo | Move the handle to the point. |
| SetPoint | Set the indexed point to the provided location. |
| HitTest | Is the point on or near the PP? (True, False) |
| Clone | Create a copy of, this PP. |
| Load | For IPersistStream. Load the CStdobj into the stream. |
| Save | For IPersistStream. Save the CStdobj into the stream. |
| GetSizeMax | For IPersistStream. Return the current size of the PP. |
| PreDraw | Set the drawing mode for the PP. |
| DrawObject | Draw the PP. |
| PostDraw | Reset the drawing mode. |
| GetText | Get the Text attribute. |
| SetText | Set the Text attribute. |
| GetTextColor | Get the Text Color attribute. |
| SetTextColor | Set the Text Color attribute. |
| GetTextHeight | Get the Text Height attribute. |
| SetTextHeight | Set the Text Height attribute. |
| GetTextBold | Get the Text Bold attribute |
| SetTextBold | Set the Text Bold attribute. |
| GetTextUnderline | Get the Text Underline attribute. |
| SetTextUnderline | Set the Text Underline attribute. |
| GetTextItalic | Get the Text Italic attribute. |
| SetTextItalic | Set the Text Italic attribute. |
| GetTextStrikeout | Get the Text Strikeout attribute. |
| SetTextStrikeout | Set the Text StrikeOut attribute. |
| GetTextFaceName | Get the Text FaceName (font) attribute. |
| SetTextFaceName | Set the Text FaceName (font) attribute. |
| GetTextAlignment | Get the Text Alignment attribute. |
| SetTextAlignment | Set the Text Alignment attribute. |

CDrawText has no additional Interfaces.

CDrawPoly renders a polygon. This class is derived from CFilledObj. Following is a description of each CDrawPoly attribute:

| | |
|---|---|
| Closed | Are we closed? (True, False) |

Following is a description of the CDrawPoly methods:

| | |
|---|---|
| Create | A static method used to create CStdobj derived objects. |
| HitTest | Is the point on or near the PP? (True, False) |
| AddPoint | Add a point to the PP in the $n^{th}$ position. |
| RemovePoint | Remove a point from the PP in the $n^{th}$ position. |
| Clone | Create a copy of this PP. |
| = | equate one PP to another PP. |
| Load | For IPersistStream. Load the CStdobj into the stream. |
| Save | For IPersistStream. Save the CStdobj into the stream. |
| GetSizeMax | For IPersistStream. Return the current size of the PP. |
| DrawObject | Draw die PP. |
| GetClosed | Get the closed attribute. |
| SetClosed | Get the closed attribute. |

CDrawPoly has no additional interfaces.

CDrawPictProp shows the properties of the visual display being built and is derived from CDrawText.

CPictGroup contains a group of picture elements (e.g., text, lines or rectangles) and is derived from CDrawPictProp. Following is a list of each CPictGroup attribute:

m_pGroupList Pointer to CObList-derived class.

CPicture is a display file containing all the elements, properties, etc., of the visual display being built and is derived from CPictGroup. CPicture is also used for subpictures. Following is a list of each CPicture attribute:

| | |
|---|---|
| m_pParams | Pointer to parameters to this picture (allows picture to be a "template" - - user-supplied parameters bind actual data values, etc.) |

CScript is used to store BasicScript-like information that is to be executed in response to a user action (e.g., select object with mouse), at display startup (initialization), etc., and is derived from CObject. Following is a list of each CScript attribute:

| | |
|---|---|
| m_pScriptText | Pointer to Script Text. |
| m_bErrors | BOOLEAN - - Compiled correctly? |

The source visual display file is translated into the destination visual display file by "reading" each source record, transposing the data contents as needed and converting all information into COM objects. Since each source record is a variant information record, each record needs to be analyzed to determine the record type and the information contained in it, To implement all translation, the source file needs to be treated as a subpicture. This is because an actual subpicture, in the source file format, has the same structure as a main picture. The source visual display file is recursively read at build time and runtime, so a recursive translator is a logical solution.

The main picture, then, consists of a header record (containing the version number), a "main subpicture" and any data structures associated with data variables (e.g., a symbol table). The "subpicture" (main picture) is first translated, then the symbol table is translated. Following is a list of each type of data which may be found in a source visual display file that should be translated into the destination file format picture.

EOI Record Information:

The "base" record of each source visual display file element is the EOI record. The EOI record contains common information about each graphic element that is to be extracted and converted to the corresponding destination file format.

The following information is converted from the source file format to the destination file format:

"Portion": (enumeration) indicates the section of the source file format where this record is located: descriptor (main picture description); subpicture (contained by this picture); constant (no data); or update (data evaluation). It is used to signal when a subpicture is finished (along with Level_2").

Object_Kind": (enumeration) converted to the COM object to be created. "Noobject" indicates a record used internally.

"Bounding_Box": (2 reals) converted to the extent box of the COM object.

"Level_2": (integer) used to indicate a conditional behavior, a variant limb, or a reference to a subpicture. It is also used to signal when a portion is finished (along with "Portion").

"Inherited_Behavior": (boolean) if true, use the default behaviors of the main picture for this object. Defaults include color, blink, intensity, and reverse video.

"Literal": (record) Converted to the behaviors of this element: includes color, blink, intensity, and reverse video.

"Counter": used for subpictures.

"Variant" signals variant object and its sub-objects.

Other information is used indirectly from the EOI record.

"Object_info_Rec": (address) if non-NULL, contains specific information about this particular object. Converted based on the object type.

The picture descriptor object contains information about the main picture or subpicture and its parameters.

The following information from the picture descriptor object is converted during operation of the illustrated method of the present invention.

"Internal_Phantom_ID": if the subpicture is a phantom (subpicture written using PASCAL), this number is the ID of the phantom. This number is used as a jump-table index to the draw routine (during building) and the execution routine (during runtime).

"Name": file name of the picture.

"OX," "OY" : these coordinates define the origin point of the (sub) picture.

"Num_Use_Visible_Params " and "User_Param_Desc ": this corresponds to the number and list of user-visible parameters to the picture. Each description contains the prompt question (e.g., "Enter X:") and the parameter name (e.g., &A) to be used for later evaluation.

"Num_Formal_Params" and "Formal_Param_Desc": this corresponds to the number and list of formal parameters to the picture. Each description contains the full name of the value to be retrieved (e.g., &A.SP), its type and subtype (if enumeration).

"Nu_Target_Param" and Target_Para_Desc": this corresponds to the number and list of parameters for target actions to the picture. The description is the same as the formal parameters.

The subpicture and phantom EOL reference objects are found in the subpicture portion of the source file format (for this block, only "subpicture" is mentioned). They indicate a reference to a contained subpicture in this picture. The numeric index of this subpicture is found in the "Level_2" indicator of the EOI record.

The following information from the subpicture and phantom EOL reference objects is converted during operation of the illustrated method of the present invention.

"Reference": indicates if this is a subpicture or a phantom: indirectly used.

If the reference is to a phantom:

"Description" is the record containing the phantom information. It is a picture descriptor record (described above). The descriptor record is contained in this record.

If the reference is to a subpicture;

The entire EOL of the subpicture is found next in the source file format. This information is read and stored as a subpicture in the intermediate file. The picture descriptor record is not contained here.

The line object describes a line of 2 to 50 points, while a solid object describes a filled polygon of 3 to 50 vertices. The source file format does not main any distinction, for line objects, between a "line" (2 points) , a "polyline" (3 to 50 points) , a "rectangle" (5 points; first and last same; with rectangle characteristics) or a "closed polygon" (3 to 50 points, first and last point same). The source file format also does not make any distinction, for solid objects, between a "filled rectangle" or a "filled polygon."

The following information is converted during operation of the illustrated method of the present invention.

"Line_Desc" or "Solid_Desc": (record) these records define the number of points in the object, followed by the list or points specifying the object.

In the illustrated embodiment, the following algorithm is used in the conversion to determine the COM object to create.

If the non-COM object is a line with 2 vertices, a COM line object is created.

If the non-COM object is a line with 3 or more vertices:

If the first and last vertices are the same, it signals a "closed" object in the source file format:

If the object has 5 vertices, and the "edges" of the object are parallel to each other, a rectangle object is created.

Otherwise, a COM closed polygon object is created.

If the first and last vertices are not the same, a COM polyline object is created.

If the source file format object is a solid with 3 or more vertices, the last vertex is assumed to be the first vertex (not specifically mentioned in the non-COM record).

If the object has 4 vertices, and the "edges" of the object are parallel to each other, a COM rectangle object is created. The attribute is set to fill the rectangle.

Otherwise, a COM closed polygon object is created. The attribute is set to fill the polygon.

The subpicture reference describes an instance of a subpicture, with the origin at the object location. The subpicture (or phantom) was previously described in the subpicture portion of the source file format. The answer records associated with this object, if they exist, are the user-entered values for the parameters to the subpicture. There is a 1-to-1 correspondence: the first answer is for the first parameter, the second answer for second parameter, etc. The detailed object information to be used in the destination file format follows.

"Ref_Num": this is the reference number of the subpicture. It is the index into the subpicture list that defines this subpicture ("Level_2" indicator in subpicture/phantom EOL reference record above).

As described above, if the answer pointer found in the EOI record is non_NULL, the answer records follow the EOI record in the source file format. The fields of the records contain user-defined input information: value sources, conditional and variant information, parameters to subpictures, etc. These records correspond to script objects found on each COM primitive object.

The following information is to be extracted from the records.

"Answer": this record contains the user data from the source file format to be placed in the script text portion. The length of the data is also found here.

Other information that is used indirectly from the answer record follows:

"Ans_ID": This integer is the position number of this answer in the source file format. This is for multiple answer records on one object (e.g., value source and value format, bar source, origin or direction). If the particular answer is a multi-paged answer (added for conditionals, variants and targets), this number is the same for the number of pages needed. Usually multi-paged answers are the last ones in the list—targets are the exception (first answer is multi-paged). This number may be used for script ordering.

As described above, if the pointer in the object info record is non-NULL, the record following any answer records contains information specific to the particular non-COM object. This information is converted for use in the COM primitive object. Each record type is described in detail below.

The EOL descriptor object contains Picture Builder default information when the main picture or subpicture was built. There are no answer records.

The comment object is only found in the descriptor portion of the source file format. It contains answer records (multi-paged) with user information about the picture. There is no detailed object information. The destination visual display file contains the answer information, which is stored in the picture documentation object as an attribute (not visible on screen).

The bar object describes a variable-filled rectangle (bar). The answer records associated with the bar are: bar expression, type (solid/hollow), direction (vertical/horizontal), left/bottom bound value, right/top bound value and origin. The detailed object information follows.

"Bar_Type": solid or hollow.

"Direction": vertical or horizontal.

The behavior object describes a conditional behavior associated with 1 or more graphic elements. The answer records associated with the behavior include: bad value behavior, initial behavior and conditional behavior (multi-paged) to evaluate. There is no detailed object information. The "Level_2" indicator of the EOI record is the number associated with this condition. All objects having this conditional behavior follow this object, and have the same "Level_2" indicator.

The target object describes a rectangular area of the picture where input events (targets) can occur, and actions (actors) are executed in response to the events. The answer records associated with targets are: target representation (solid, hollow or invisible), and the target actions (multi-paged) to be executed. The detailed object information follows.

"Shape": this enumeration is the representation of the target (solid, hollow, invisible).

Target_Type": this enumeration is the target type specifier. The Picture Builder has regular targets (event/action) and "special" targets (executed at initial invoke, cleanup before draw of new picture, and for special keys: page forward/back, help, etc.). Special targets are not displayed, and have no graphic information associated with them.

The value object describes a displayed output of a variable or expression. The answer records for this object are: value expression and output format of the value. The detailed object information follows.

"Value_Type": this enumeration is the final type of the value (integer, etc.).

"Field_Width": this number is the width (in characters) of the output.

The variant object describes a variant (visibility) behavior associated with 1 or more graphic elements. The answer records associated with this object are: bad value object and the variant text script (multi-paged). The objects associated with the variant are text objects and subpicture references only. The "Variant" record of the EOI record contains the variant number associated with this variant with the limb number 0.

Each of the objects associated with this variant have the same number, as well as their limb indicator, in the EOI record. Limb numbering starts at 1 for the bad value limb, and 2 (and up) for the variant limbs. For example:

IF A100.SP>100.0 THEN "high" ELSE "low"

"high" text object=limb 2

"low" text object=limb 3

The detailed object information follows.

Following the picture element objects are the records defining the symbol table. The symbol table is a list of the variables referenced in the picture. One record exists for each variable (even though a variable may occur multiple times). These records must be registered with the COM Data List object. The following information in each record is used.

"Name": the name (and name length) of the variable.

"Collection_Rate": this is the update rate of the variable. This number is multiplied by 4 to get the number of seconds for the actual rate.

"Group_ID": this number is the ID of the collection group for the variable. This field shows fast (½ second update rate) update, as well as any user-defined collection groups.

"Data_Type": this is the type of the variable (integer, real, string, etc.).

"Data_Subtype": this is for enumerations (set number) or blind records.

"Ref_Count": this is the number of occurrences of this variable in this picture.

"Target_Type", "Target_Subtype": type and subtype of target variables (similar to above three items).

Open, Close, Save, and SaveAs operations must interface between the COM Picture and the underlying Windows® NT File System. When translating a source visual display file, interfacing to the Script Object, Data List, Graphics Primitives and Picture Controls is required.

Following is the table listing the source visual display file elements and their corresponding "availability" estimates in the destination file format. Availability depends on when the corresponding COM objects will be available, as well as script and data (variable) availability.

| Source Visual Display file Elements | COM Increment | Corresponding COM Object | Comments |
|---|---|---|---|
| Line | 2 | Line, Polyline, Rectangle, Closed Polyline | Source makes no distinction - - COM has different objects for the distinct types. "Closed" can be attribute for COM. |
| Solid | 2 | Rectangle, Closed Polyline | Source makes no distinction - - COM distinguishes. "Fill" can be attribute for COM. |
| Text | 2 | Text | Static text. |
| Bar | 3 | Rectangle | Dialog boxes for values. |
| Value | 3/5 | "Value" | Increment 3: Static Text object only. Increment 5: text object with dialog box for value to display. |
| Picture Comment | 5 | CPicture | Script needed - - no checking done, though. Source has no visible object. |
| Conditional | 4 | any | Script needed. |

-continued

| Source Visual Display file Elements | COM Increment | Corresponding COM Object | Comments |
|---|---|---|---|
| Behavior Target | 5 | CDrawRect | Script needed. Part of source file format actors also needed. |
| Variant | 4 | CPict Group | Source has subpictures and phantoms internally as list. Subpictures are a "recursion" of the main picture. |
| Symbol Table Information | N/A | N/A | |

Figure 4:
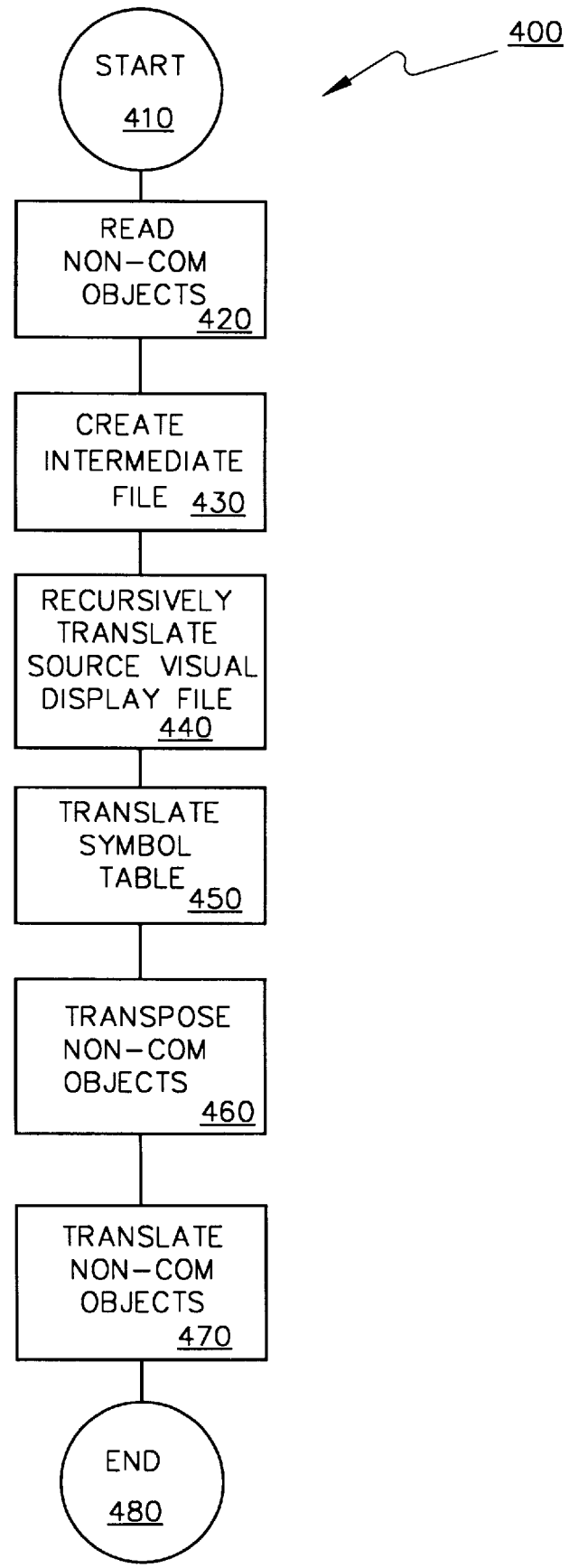
FIG. 4 illustrates a flow diagram of the method of the present invention.

Turning now to FIG. 4, illustrated is a flow diagram of the method of the present invention. The method, generally designated 400, begins in a start block 410, when it is desired to translate a source visual display file having a plurality of related non-COM objects arranged in a source file format into a destination visual display file having a destination file format. The source visual display file preferably contains an EOI containing one or more data types selected from the group consisting of: (1) portion_level, (2) object_kind, (3) bounding_box, (4) level_2, (5) inherited_behavior, (6) literal, (7) counter and (8) variant. The source visual display file further preferably contains an object_info_rec data type. For purposes of the present invention, these are equivalent data types.

The source visual display file preferably contains one or more objects selected from the group consisting of: (1) a picture descriptor object, (2) a subpicture/phantom EOL reference object, (3) a line object, (4) a solid object, (5) a subpicture reference object, (6) answer port information, (7) an EOL descriptor object, (8) a comment object, (9) a bar object, (10) a behavior object, (11) a target object, (12) a value object, (13) a variant object (14) and a symbol table record. For purposes of the present invention, these are equivalent objects.

In a block 420, the plurality of related non-COM objects of the source visual display file are read. In a block 430, an intermediate file is created. The intermediate file is illustrated as comprising a main picture containing a header record, a main subpicture for containing the plurality of related non-COM objects and a data structure associated with data variables of the source visual display file. Most preferably, the data structure contains a symbol table.

In a block 440, the source visual display file is treated as a subpicture, being recursively translated from the source visual display file and written into the main subpicture of the intermediate file. Next, in a block 450, the symbol table of the source visual display file is translated and written into the intermediate file.

Then, in a block 460, at least some of the plurality of related non-COM objects are transposed from the source file format into the destination file format and written into the main subpicture of the intermediate file. Finally, in a block 470, at least some of the transposed plurality of related non-COM objects are translated into COM objects and written into the destination visual display file. The method ends in an end block 480.

From the above, it is apparent that the present invention provides a system for, and method of, translating a source visual display file having a plurality of related non-COM objects arranged in a source file format into a destination visual display file having a destination file format. The system includes: (1) a reading circuit that reads the plurality of related non-COM objects of the source visual display file, (2) a transposition circuit that transposes at least some of the plurality of related non-COM objects from the source file format into the destination file format and (3) a translation circuit that converts at least some of the transposed plurality of related non-COM objects into COM objects, the source visual display file thereby translated into the destination visual display file capable of generating a visual display substantially similar to the source visual display file.

Although the present invention and its advantages have been described in detail, those skilled in the art should understand that they can make various changes, substitutions and alterations herein without departing from the spirit and scope of the invention in its broadest form.

What is claimed is:

1. A system for translating a source visual display file having a plurality of related non-Component Object Model (COM) objects arranged in a source file format into a destination visual a display file having a destination file format, comprising:

a reading circuit that reads said plurality of related non-COM objects of said source visual display file;

a transposition circuit that transposes at least some of said plurality of related non-COM objects from said source file format into said destination file format; and a translation circuit that converts at least some of said transposed plurality of related non-COM objects into COM objects, said source visual display file thereby translated into said destination visual display file capable of generating a visual display substantially similar to said source visual display file.

2. The system as recited in claim 1 wherein said reading circuit treats said source visual display file as a subpicture, said system thereby being a recursive translator.

3. The system as recited in claim 1 wherein said reading circuit creates an intermediate file comprising:

a main picture containing a header record;

a main subpicture containing said plurality of related non-COM objects; and a data structure associated with data variables of said source visual display file, said data structure containing a symbol table.

4. The system as recited in claim 1 wherein said source visual display file contains a symbol table, said translation circuit translating said symbol table into an intermediate file.

5. The system as recited in claim 1 wherein said source visual display file contains an edit object item (EOI) containing a data type selected from the group consisting of:

portion_level, object_kind, bounding_box, level_2, inherited_behavior, literal, counter, and variant.

6. The system as recited in claim 1 wherein said source visual display file contains an edit object item (EOI) containing an object_info_rec data type.

7. The system as recited in claim 1 wherein said source visual display file contains an object selected from the group consisting of:

a picture descriptor object, a subpicture/phantom edit object list (EOL) reference object, a line object, a solid object, a subpicture reference object, answer port information, an EOL descriptor object, a comment object, a bar object, a behavior object, a target object, a value object, a variant object, and a symbol table record.

8. A method of translating a source visual display file having a plurality of related non-Component Object Model (COM) objects arranged in a source file format into a destination visual display file having a destination file format, comprising the steps of:

reading said plurality of related non-COM objects of said source visual display file;

transposing at least some of said plurality of related non-COM objects from said source file format into said destination file format; and converting at least some of said transposed plurality of related non-COM objects into COM objects, said source visual display file thereby translated into said destination visual display file capable of generating a visual display substantially similar to said source visual display file.

9. The method as recited in claim 8 further comprising the step of treating said source visual display file as a subpicture, thereby recursively translating said source visual display file.

10. The method as recited in claim 8 further comprising the step of creating an intermediate file comprising:

a main picture containing a header record;

a main subpicture containing said plurality of related non-COM objects; and a data structure associated with data variables of said source visual display file, said data structure containing a symbol table.

11. The method as recited in claim 8 wherein said source visual display file contains a symbol table, said method further comprising the step of translating said symbol table into an intermediate file.

12. The method as recited in claim 8 wherein said source visual display file contains an edit object item (EOI) containing a data type selected from the group consisting of:

portion_level, object_kind, bounding_box, level_2, inherited_behavior, literal, counter, and variant.

13. The method as recited in claim 8 wherein said source visual display file contains an edit object item (EOI) containing an object_info_rec data type.

14. The method as recited in claim 8 wherein said source visual display file contains an object selected from the group consisting of:

a picture descriptor object, a subpicture/phantom edit object list (EOL) reference object, a line object, a solid object, a subpicture reference object, answer port information, an EOL descriptor object, a comment object, a bar object, a behavior object, a target object, a value object, a variant object, and a symbol table record.

15. A real time process control system, comprising:

a computer system capable of executing a control program;

a plurality of sensors and controllable devices;

a data bus coupling said computer system to said plurality of sensors and controllable devices;

a visual display capable of displaying graphical representations of at least some of said plurality of sensors and controllable devices, said control program employing a destination visual display file having a destination file format to drive said visual display; and a translation system for translating a source visual display file having a plurality of related non-Component Object Model (COM) objects arranged in a source file format into said destination visual display file, said translation system including:

a reading circuit that reads said plurality of related non-COM objects of said source visual display file, a transposition circuit that transposes at least some of said plurality of related non-COM objects from said source file format into said destination file format, and a translation circuit that converts at least some of said transposed plurality of related non-COM objects into COM objects, said source visual display file thereby translated into said destination visual display file.

16. The system as recited in claim 15 wherein said reading circuit treats said source visual display file as a subpicture, said system thereby being a recursive translator.

17. The system as recited in claim 15 wherein said reading circuit creates an intermediate file comprising:

a main picture containing a header record;

a main subpicture containing said plurality of related non-COM objects; and a data structure associated with data variables of said source visual display file, said data structure containing a symbol table.

18. The system as recited in claim 15 wherein said source visual display file contains a symbol table, said translation circuit translating said symbol table into an intermediate file.

19. The system as recited in claim 15 wherein said source visual display file contains an edit object item (EOI) containing a data type selected from the group consisting of:

portion_level, object_kind, bounding_box, level_2, inherited_behavior, literal, counter, and variant.

20. The system as recited in claim 15 wherein said source visual display file contains an edit object item (EOI) containing an object_info_rec data type.

21. The system as recited in claim 15 wherein said source visual display file contains an object selected from the group consisting of:

a picture descriptor object, a subpicture/phantom edit object list (EOL) reference object, a line object, a solid object, a subpicture reference object, answer port information, an EOL descriptor object, a comment object, a bar object, a behavior object, a target object, a value object, a variant object, and a symbol table record.

* * * * *